Dec. 1, 1964    N. A. RUSSELL ETAL    3,159,176
CHECK-RELIEF VALVE
Filed Dec. 7, 1962
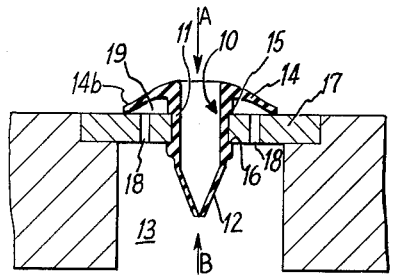
Fig.1
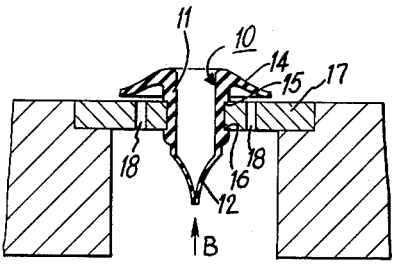
Fig.2
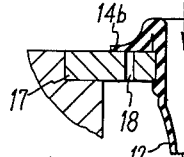
Fig.10
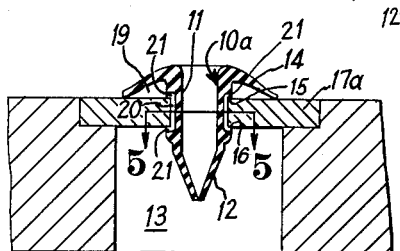
Fig.3
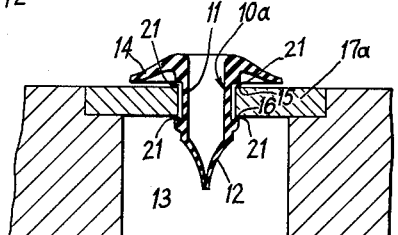
Fig.4
Fig.5
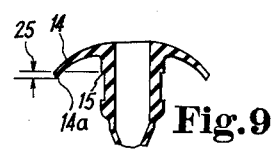
Fig.9
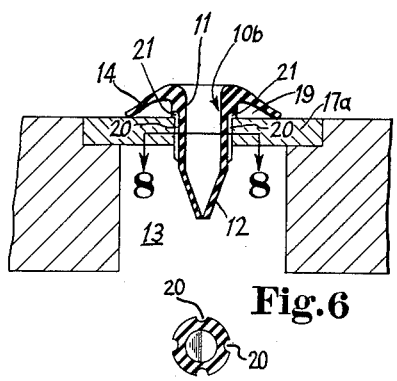
Fig.6
Fig.8
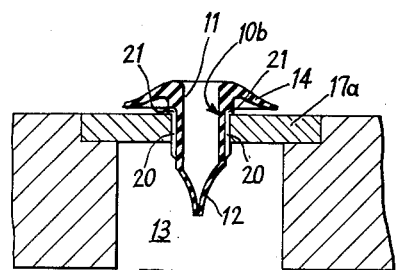
Fig.7
INVENTORS
NORTON A. RUSSELL AND
BY  ROBERT T. GIFFORD,
Youngblut, Melville, Strasser & Foster
ATTORNEYS

3,159,176
CHECK-RELIEF VALVE
Norton A. Russell and Robert T. Gifford, Yellow Springs, Ohio, assignors to Vernay Laboratories, Inc., Yellow Springs, Ohio, a corporation of Ohio
Filed Dec. 7, 1962, Ser. No. 242,971
6 Claims. (Cl. 137—493.1)

This invention relates to a check-relief valve element and specifically to a valve element which is adapted for use in hydraulic brake systems and in various other fields where it is desired to permit flow of fluid in one direction but to check it in the opposite direction, and where a relief action in said opposite direction must be provided for in the event that the back pressure exceeds a certain value.

Relief valves of the type generally outlined above are available on the market but they are generally complicated by the fact that a compression spring is used to hold the valve against the seat under back pressure up to a certain value, the spring being designed so that it will yield when a predetermined pressure is exceeded so that the valve may then lift off its seat to relieve the excessive back pressure.

Springs unduly add to the expense of these valves and furthermore the spring element is subject to deterioration in strength and to breakage, and it is therefore an object of the present invention to provide a valve of the type generally outlined above, but which eliminates the need for a spring. It is another object of the invention to provide such a valve which is formed in one piece, and which may be easily installed and will be substantially fool-proof in operation.

These and other objects of the invention which will be more specifically pointed out hereinafter are accomplished by the present invention which will be disclosed hereinafter in several embodiments.

Reference is made to the drawing forming a part hereof and in which:

FIGURE 1 is a cross-sectional view of one embodiment of the valve element in position for normal action.

FIGURE 2 is a view similar to FIGURE 1 showing the position of the valve under excessive back pressure.

FIGURE 3 is a view similar to FIGURE 1 of a modification of the valve element showing it in its normal position.

FIGURE 4 is a view similar to FIGURE 3 showing the valve in the position it occupies when relieving excessive back pressure.

FIGURE 5 is a fragmentary cross-sectional view taken on the line 5—5 of FIGURE 3.

FIGURE 6 is a view similar to FIGURES 1 and 3 showing still another embodiment of the invention in its normal position.

FIGURE 7 is a view similar to FIGURE 6 showing the valve of FIGURE 6 when it is relieving excessive back pressure.

FIGURE 8 is a fragmentary cross-sectional view taken on the line 8—8 of FIGURE 6, and FIGURE 9 is a fragmentary view showing the shape of the valve element as molded and before installation.

FIGURE 10 is a fragmentary view showing the valve element as it appears when fluid is flowing therethrough in the intended direction.

Briefly, in the practice of the invention there is provided a rubber or rubber-like valve element having a tubular body portion from one end of which there extends a conventional duck bill valve element and which is adapted to be secured in the aperture through which fluid must flow in one direction and be checked in the opposite direction. It is to be understood that although the valve element has just been described as "rubber or rubber-like," any resilient or pliable material including natural or synthetic rubbers will suffice. At the end of the tubular body opposite the duck bill valve element there is provided an annular rim or umbrella portion. This umbrella portion extends outwardly from the tubular body portion and contacts the surface of the plate or wall in which the valve element is mounted, so as to provide an annular chamber around said tubular body. One or more by-pass passages are provided into the chamber under the umbrella portion of the valve so that when the back pressure exceeds that for which the valve is designed, the periphery of the umbrella portion is lifted off to relieve the pressure. Preferably, as will be described in greater detail shortly, the umbrella portion is given a pre-load dimension designed to regulate the "blow-off" pressure, assuring close control and permitting easy and unskilled assembly.

Referring now more specifically to the drawings and first to the embodiment of FIGURES 1 and 2, the valve proper is indicated generally at 10. It comprises the tubular body portion 11 and the duck bill portion 12 extending therefrom into a space 13 which may be a tank or vessel into which fluid may flow in the direction of the arrow A, but which must prevent normal back flow in the direction of the arrow B. The umbrella portion above referred to is indicated at 14, and it extends annularly from the tubular body 11 as clearly seen in FIG. 1. Preferably the umbrella portion 14 is given a pre-load dimension as illustrated in FIGURE 9 wherein extreme periphery 14a, which periphery constitutes the sealing edge or lip of the umbrella portion 14, is made a determined dimension 25 below the shoulder 15. This structure, when the valve element is installed on a rigid vessel or member 17, gives a lip pressure at 14b against the face of the member 17, which pressure can be predetermined as desired, particularly in situations wherein a resilient or pliable material, including natural or synthetic rubbers, of known characteristics is employed, by adjusting the dimension 25 for the application performance desired.

In this particular embodiment the tubular body 11 is provided with spaced shoulders 15 and 16 which engage the wall of the vessel, or a plate forming a part of the vessel and indicated at 17. This engagement is in the manner of a conventional rubber grommet. The plate 17 or the wall in which the valve element is mounted, is provided with one or more by-pass passages 18 which communicate with the annular chamber 19 under the umbrella portion 14.

From this description is will be clear that when fluid flows under pressure in the direction of the arrow A, the duck bill valve element 12 opens to permit the flow. This is clearly shown in FIGURE 10. The duck bill portion or lips 12 are open and the umbrella portion 14 is deformed rather severely downward against the sealing plate 17. Normal flow resulting from pressure in the direction of the arrow B, however, when flow in the direction A is discontinued, cannot take place because the duck bill portion 12 closes and seals.

If, however, the pressure in the direction B exceeds a certain value, this pressure applied through the aperture or apertures 18 to the chamber 19, will cause the umbrella portion 14 to lift up peripherally as clearly shown in FIGURE 2, thus providing the necessary relief. It will be understood that the portion 14 can be molded of such thickness and such diameter and of such height with respect to the plate 17 that the umbrella portion 14 will yield at the required pressure. Also, close control of the movement of this umbrella portion 14 can be further attained by the interrelation between the lip height and the top shoulder height (the dimension 25), which may be used to determine the amount of interference between the sealing lip and the flat surface to which the valve element is assembled, all as earlier described in connection with reference to FIGURE 9.

The embodiment disclosed in FIGURES 3 to 5 inclusive differs from that of FIGURES 1 and 2 in that all that is necessary for the mounting of the valve and its proper functioning is a punched or drilled hole. In FIGURES 3 to 5 inclusive the valve element as a whole is generally indicated at 10a and other parts which are the same as in the embodiment of FIGURES 1 and 2, are given like reference numerals. The basic difference in the embodiment of FIGURES 3 to 5 inclusive resides in the provision of one or more exhaust grooves 20 on the exterior of the tubular body portion 11 communicating with radial grooves 21. In this embodiment the communication from the space 13 to the chamber 19 is through the grooves 20 and 21, and it is unnecessary to provide the by-pass apertures 18 as described in connection with FIGURES 1 and 2. In all other respects the valve of FIGURES 3 to 5 inclusive functions in the same manner as the valve of FIGURES 1 and 2.

The embodiment of FIGURES 6 to 8 inclusive is very similar to the embodiment of FIGURES 3 to 5 inclusive except that it is still further simplified in that the lower shoulder 16 has been omitted and the wall of the tubular portion between the grooves 20 is made of such diameter that it is a press fit in the plate 17A. The grooves 20 as before communicate with the radial grooves 21 so that access from the area 13 into the chamber 19 is through the grooves 20 and 21. Again, in all other respects, the valve functions exactly like that of FIGURES 3 to 5 inclusive.

It will be understood that where in the specification and the claims reference is made to rubber or rubber-like material, it is intended that this term shall be inclusive of any resilient or pliable material including natural rubbers. Those skilled in the art will be able to determine the characteristic which must be imparted to the umbrella portion in order that the umbrella portion will open at and above any particular pressure.

Since the showing of the drawings is exemplary only, no limitations are to be applied in the claims other than those specifically set forth therein. What is claimed is:

1. A resilient unitary check-relief valve element comprising a tubular body portion having means for engaging it in an aperture in a plate or the like, a duck bill portion extending from one end of said tubular body portion, said duck bill portion comprising a pair of resilient lips, and a resilient umbrella portion extending annularly from the other end of said tubular body portion, the said resilient lips of said duck bill portion separating to permit fluid flow in one direction and closing to check fluid flow in the opposite direction, said resilient umbrella portion being adapted to bear against one side of the plate or the like in which said resilient unitary check-relief valve element is engaged, and by-pass means extending from the other side of the plate or the like to said resilient umbrella portion, said resilient umbrella portion normally checking fluid flow both in said one direction and in said opposite direction, and said resilient umbrella portion flexing so as to permit fluid to flow around the periphery thereof in said opposite direction when the pressure in said by-pass means reaches a predetermined amount.

2. A valve element according to claim 1 wherein said by-pass means comprises at least one groove provided axially on the outside of said tubular body portion.

3. A valve element according to claim 1 wherein said by-pass means comprises at least one additional aperture in the plate or the like.

4. A resilient unitary check-relief valve element comprising a tubular body portion having means for engaging it in an aperture in a plate or the like, a duck bill portion extending from one end of said tubular body portion, said duck bill portion comprising a pair of resilient lips, and a resilient umbrella portion extending annularly from the other end of said tubular body portion, the said resilient lips of said duck bill portion separating to permit fluid flow in one direction and closing to check fluid flow in the opposite direction, said resilient umbrella portion being adapted to bear peripherally against the plate or the like in which said resilient unitary valve element is engaged so as to provide, in cooperation with one side of such plate or the like, an annular chamber about said tubular body portion, and by-pass means extending from the other side of such plate or the like to said annular chamber, said resilient umbrella portion normally checking fluid flow both in said one direction and in said opposite direction, and said resilient umbrella portion flexing so as to permit fluid to flow around the periphery thereof in said opposite direction when the pressure in said annular chamber reaches a predetermined amount.

5. A valve element according to claim 4 in which the means for engaging said resilient unitary check-relief valve element in the aperture in the plate or the like comprises an annular shoulder on said tubular body portion and adapted to bear against said one side of such plate or the like, and in which the extreme periphery of said umbrella portion constitutes a sealing lip, said sealing lip, before said valve element is engaged in the aperture in the plate or the like, extending beyond said annular shoulder, whereby when said valve element is engaged in the aperture in the plate or the like so that said shoulder bears against said one side of the plate, said sealing lip will engage the plate so as to cause said umbrella portion to be flexed.

6. A valve element according to claim 4 wherein the outside diameter of said tubular body portion is such that said tubular body portion must be press-fitted into the aperture in the plate or the like, and wherein the means for engaging said resilient unitary check-relief valve element in the aperture in the plate or the like comprises an annular shoulder on said tubular body portion and adapted to bear against said one side of the plate or the like, and said by-pass means constitutes at least one groove provided axially on the outside of said tubular body portion and on the underside at least of said shoulder.

References Cited by the Examiner
UNITED STATES PATENTS

| | | | |
|---|---|---|---|
| 2,068,481 | 1/37 | Brown | 137—516.15 XR |
| 2,431,457 | 11/47 | Bondurant | 137—493 XR |
| 2,546,213 | 3/51 | Clemmons | 137—525.3 XR |
| 2,571,893 | 10/51 | Kendall | 137—525 XR |
| 2,579,855 | 12/51 | Pockel et al. | 137—525 XR |

MARTIN P. SCHWADRON, *Primary Examiner.*